(12) United States Patent
Aso

(10) Patent No.: US 8,220,506 B2
(45) Date of Patent: Jul. 17, 2012

(54) STRUCTURE FOR FUEL FILLING SECTION OF FUEL TANK

(75) Inventor: Shuichi Aso, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 110 days.

(21) Appl. No.: 12/742,555

(22) PCT Filed: Nov. 26, 2008

(86) PCT No.: PCT/JP2008/071405
§ 371 (c)(1),
(2), (4) Date: May 12, 2010

(87) PCT Pub. No.: WO2009/069632
PCT Pub. Date: Jun. 4, 2009

(65) Prior Publication Data
US 2010/0270300 A1   Oct. 28, 2010

(30) Foreign Application Priority Data
Nov. 29, 2007   (JP) .................................. 2007-309276

(51) Int. Cl.
*B65B 3/04* (2006.01)
(52) U.S. Cl. ........ 141/305; 141/302; 141/350; 220/86.2
(58) Field of Classification Search .......... 141/348–350, 141/301–302, 305; 220/86.2
See application file for complete search history.

(56) References Cited

U.S. PATENT DOCUMENTS

| | | | | |
|---|---|---|---|---|
| 5,071,018 A | * | 12/1991 | Moore | 220/86.2 |
| 5,271,438 A | * | 12/1993 | Griffin et al. | 141/59 |
| 5,439,129 A | * | 8/1995 | Buechler | 220/86.2 |
| 5,730,194 A | * | 3/1998 | Foltz | 141/301 |
| 5,960,839 A | * | 10/1999 | Armesto et al. | 141/304 |
| 6,155,316 A | | 12/2000 | Benjey | |

(Continued)

FOREIGN PATENT DOCUMENTS

JP   U-02-025782   2/1990

(Continued)

OTHER PUBLICATIONS

Japanese Office Action issued in Application No. 2007-309276; Mailed on Jan. 6, 2009 (With Translation).

(Continued)

*Primary Examiner* — Timothy L Maust
*Assistant Examiner* — Timothy Kelly
(74) *Attorney, Agent, or Firm* — Oliff & Berridge, PLC

(57) ABSTRACT

A structure for a fuel filling section of a fuel tank is obtained, in which valve opening pressure of a negative pressure valve, that opens a fuel filling port when a fuel tank interior is negative pressure, can be set independently of a valve opening pressure of an opening/closing valve that opens the fuel filling port due to insertion of a fuel filling gun. A positive pressure valve (50), that opens when the fuel tank interior becomes positive pressure, and a flap valve (70), that opens by being pushed by the fuel filling gun, are provided within a filler pipe (24). Further, a negative pressure valve (60), that opens when the fuel tank interior becomes negative pressure, is provided separately from the flap valve (70). A valve opening pressure of the flap valve (70) can be set without considering a valve opening operation when a fuel tank (10) interior becomes negative pressure.

2 Claims, 17 Drawing Sheets

U.S. PATENT DOCUMENTS

| | | |
|---|---|---|
| 6,189,581 B1 | 2/2001 | Harris et al. |
| 6,230,739 B1 * | 5/2001 | Gericke .................. 137/588 |
| 6,691,750 B1 * | 2/2004 | Foltz ...................... 141/350 |
| 7,077,178 B2 * | 7/2006 | Hedevang ............... 141/367 |

FOREIGN PATENT DOCUMENTS

| | | |
|---|---|---|
| JP | A-05-029594 | 7/1993 |
| JP | Y2-05-29594 | 7/1993 |
| JP | A-05-032334 | 8/1993 |
| JP | Y2-05-32334 | 8/1993 |
| JP | A-08-142694 | 6/1996 |
| JP | A-2001-047876 | 2/2001 |
| WO | WO 2008/013325 A1 | 1/2008 |

OTHER PUBLICATIONS

International Search Report issued in Application No. PCT/JP2008/071405; Mailed on Jan. 13, 2009 (With Translation).

* cited by examiner

STRUCTURE FOR FUEL FILLING SECTION OF FUEL TANK

TECHNICAL FIELD

The present invention relates to a structure for a fuel filling section of a fuel tank.

BACKGROUND TECHNOLOGY

As a structure for a fuel filling section for filling fuel into the fuel tank of an automobile or the like, a structure having a valve body (opening/closing valve) that is usually closed and that opens against the urging force of a spring when pushed by a fuel filling gun, is disclosed in Patent Document 1. When the pressure within a tank main body becomes a negative pressure of a predetermined value or more, the valve body opens slightly against the urging force of the spring such that the pressure within the tank main body does not become greater than or equal to a predetermined pressure. Further, the structure of Patent Document 1 is provided with a positive pressure valve that opens when the pressure within the tank main body becomes higher than a valve opening pressure that is set by the spring force.

However, in the structure of Patent Document 1 and the like, the urging force of the spring that urges the valve body (the opening/closing valve) is set to be high in order to improve the sealability by the valve body and in order to suppress rattling, and therefore, an urging force, i.e., a valve opening pressure, that corresponds to the magnitude of the negative pressure that arises within the fuel tank main body, cannot be set.

Patent Document 1: Japanese Patent Application Laid-Open No. 8-142694

DISCLOSURE OF THE INVENTION

Problems to be Solved by the Invention

In view of the above-described circumstances, the subject of the present invention is to obtain a structure for a fuel filling section of a fuel tank that can set the valve opening pressure of a negative pressure valve that opens a fuel filling port when a fuel tank interior is negative pressure, independently from a valve opening pressure of an opening/closing valve that opens the fuel filling port due to insertion of a fuel filling gun.

Means for Solving the Problems

A first aspect of the present invention has: a fuel filling port member that structures a fuel filling port in which a fuel filling gun, for filling fuel into a fuel tank, is inserted; an opening/closing valve that is provided at the fuel filling port member and closes the fuel filling port, and that opens the fuel filling port when pushed by the fuel filling gun that is inserted; a positive pressure valve that, in a closed state of the opening/closing valve, opens the fuel filling port when a tank internal pressure of the fuel tank is greater than a tank external pressure; and a negative pressure valve that, in the closed state of the opening/closing valve, opens the fuel filling port when the tank internal pressure of the fuel tank is less than the tank external pressure.

In the structure for a fuel filling section of a fuel tank, usually, the fuel filling port is closed by the opening/closing valve, but when a fuel filling gun is inserted in the fuel filling port, the opening/closing valve is pushed by the fuel filling gun and opens the fuel filling port.

Further, this structure for a fuel filling section of a fuel tank has the positive pressure valve that, in the closed state of the opening/closing valve, opens the fuel filling port when the tank internal pressure of the fuel tank is greater than the tank external pressure (i.e., when the fuel tank interior becomes positive pressure), and therefore, the internal pressure of the fuel tank rising excessively can be suppressed.

Moreover, this structure for a fuel filling section of a fuel tank has the negative pressure valve that opens the fuel filling port when the tank internal pressure of the fuel tank is smaller than the tank external pressure (i.e., when the fuel tank interior becomes negative pressure), and therefore, the internal pressure of the fuel tank decreasing excessively can be suppressed.

In this way, by providing, in addition to the opening/closing valve, the negative pressure valve that opens the fuel filling port when the fuel tank interior becomes negative pressure, the valve opening pressure of the negative pressure valve can be set independently of the valve opening pressure of the opening/closing valve. Namely, the negative pressure valve is set so as to be opened in a state in which the negative pressure of the fuel tank is small, more so than the opening/closing valve.

In the above-described aspect, the negative pressure valve may be provided at the opening/closing valve.

By providing the negative pressure valve at the opening/closing valve in this way, the assembling of the negative pressure valve to the fuel filling port member is easy as compared with a structure in which the negative pressure valve is provided at a completely separate body from the opening/closing valve.

Further, the negative pressure valve may be provided at a surface, of the opening/closing valve, opposite a surface that is pushed by the fuel filling gun.

By providing the negative pressure valve at the reverse surface (the surface opposite the surface that is pushed by the fuel filling gun) of the opening/closing valve, the pressing force of the fuel filling gun is not applied to the negative pressure valve, and therefore, the negative pressure valve unintentionally opening the fuel filling port can be suppressed.

In the above-described aspect, the positive pressure valve may be provided at the opening/closing valve.

By providing the positive pressure valve at the opening/closing valve in this way, the assembling of the positive pressure valve to the fuel filling port member is easy as compared with a structure in which the positive pressure valve is provided at a completely separate body from the opening/closing valve.

In the above-described aspect, the positive pressure valve may have: a positive pressure valve main body that is movable between a positive pressure valve open position at which the positive pressure valve main body opens the fuel filling port, and a positive pressure valve closed position at which the positive pressure valve main body closes the fuel filling port further toward a fuel tank side than the positive pressure valve open position, a spring for the positive pressure valve that urges the positive pressure valve main body toward the positive pressure valve closed position, and a positive pressure valve supporting member that supports and maintains, at the positive pressure valve closed position, the positive pressure valve main body that is urged by the spring for the positive pressure valve, and the negative pressure valve may have: a negative pressure valve main body that is provided further toward the fuel tank side than the positive pressure valve main body, and that is movable between a negative pressure valve open position at which the negative pressure valve main body opens the fuel filling port, and a negative pressure valve closed position at which the negative pressure valve main body closes the fuel filling port by contacting the positive pressure valve main body, and a spring for the negative pressure valve that urges the negative pressure valve main body toward the negative pressure valve closed position, and whose urging force is set to be smaller than an urging force of the spring for the positive pressure valve.

In this structure for a fuel filling section of a fuel tank, the positive pressure valve main body, that is urged to the positive pressure valve closed position by the spring for the positive pressure valve, is supported and is maintained at the positive pressure valve closed position by the positive pressure valve supporting member. When the fuel tank interior becomes positive pressure, the positive pressure valve main body moves toward the outer side of the fuel tank, i.e., to the positive pressure valve open position, against the urging force of the spring for the positive pressure valve.

Further, in this structure for a fuel filling section of a fuel tank, the negative pressure valve main body, that is urged toward the negative pressure valve closed position by the spring for the negative pressure valve, contacts the positive pressure valve main body and maintains the negative pressure valve closed position. Further, when the fuel tank interior becomes negative pressure, the negative pressure valve main body moves toward the inner side of the fuel tank against the urging force of the spring for the negative pressure valve and moves apart from the positive pressure valve main body, and moves to the negative pressure valve open position.

In this way, the negative pressure valve main body is made to contact the positive pressure valve main body and is supported at the negative pressure valve closed position. Namely, because there is no need for a member for supporting the negative pressure valve main body at the negative pressure valve closed position, simplification of the structure can be aimed for as compared with a structure in which such a member is needed.

Effects of the Invention

Because the present invention has the above-described structure, the valve opening pressure of a negative pressure valve, that opens a fuel filling port when a fuel tank interior is negative pressure, can be set independently from the valve opening pressure of an opening/closing valve that opens the fuel filling port due to insertion of a fuel filling gun.

PREFERRED FORMS FOR IMPLEMENTING THE INVENTION

Figure 1:
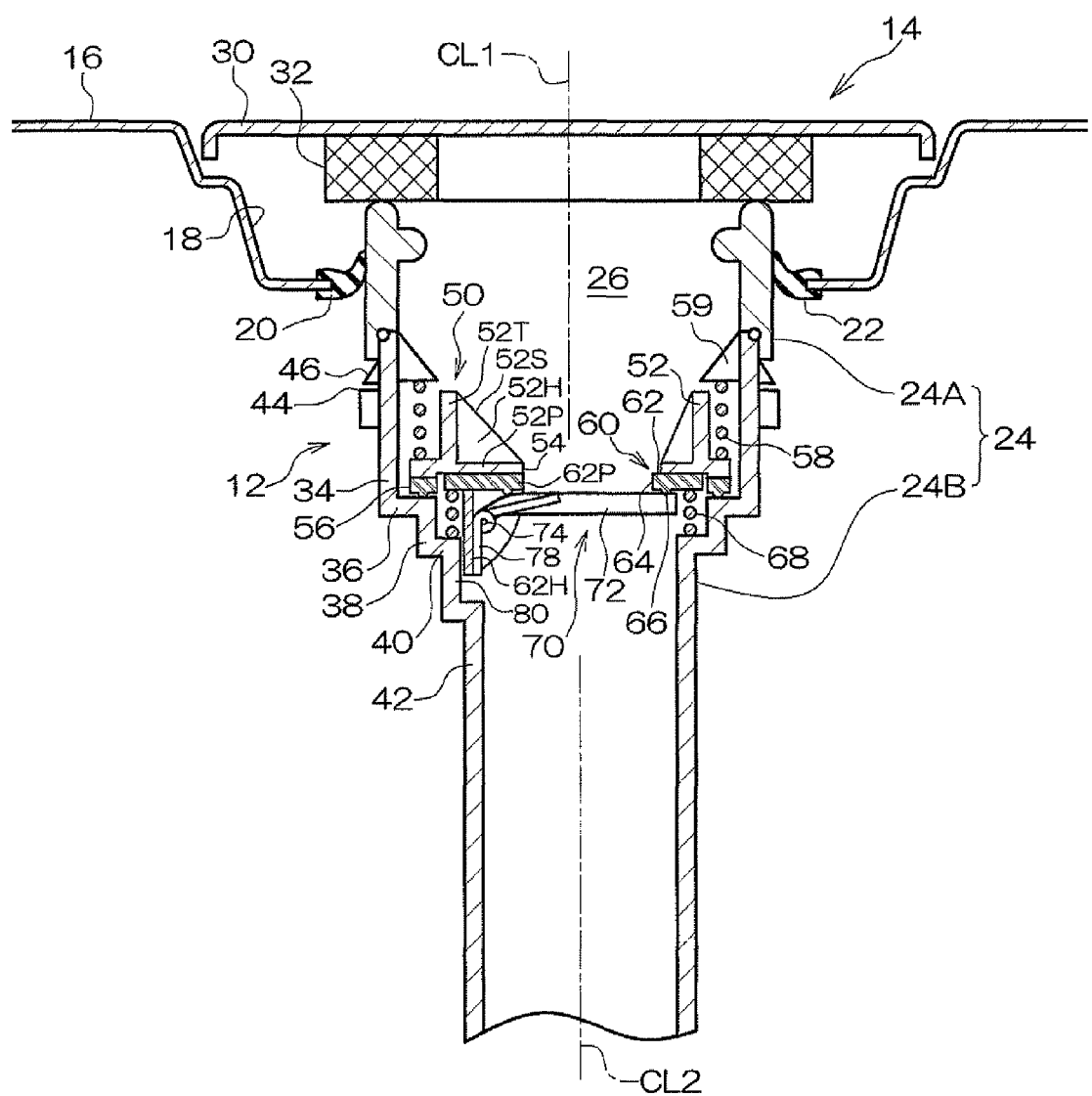
FIG. 1 is a cross-sectional view showing a structure for a fuel filling section of a fuel tank of a first embodiment of the present invention.
Figure 17:
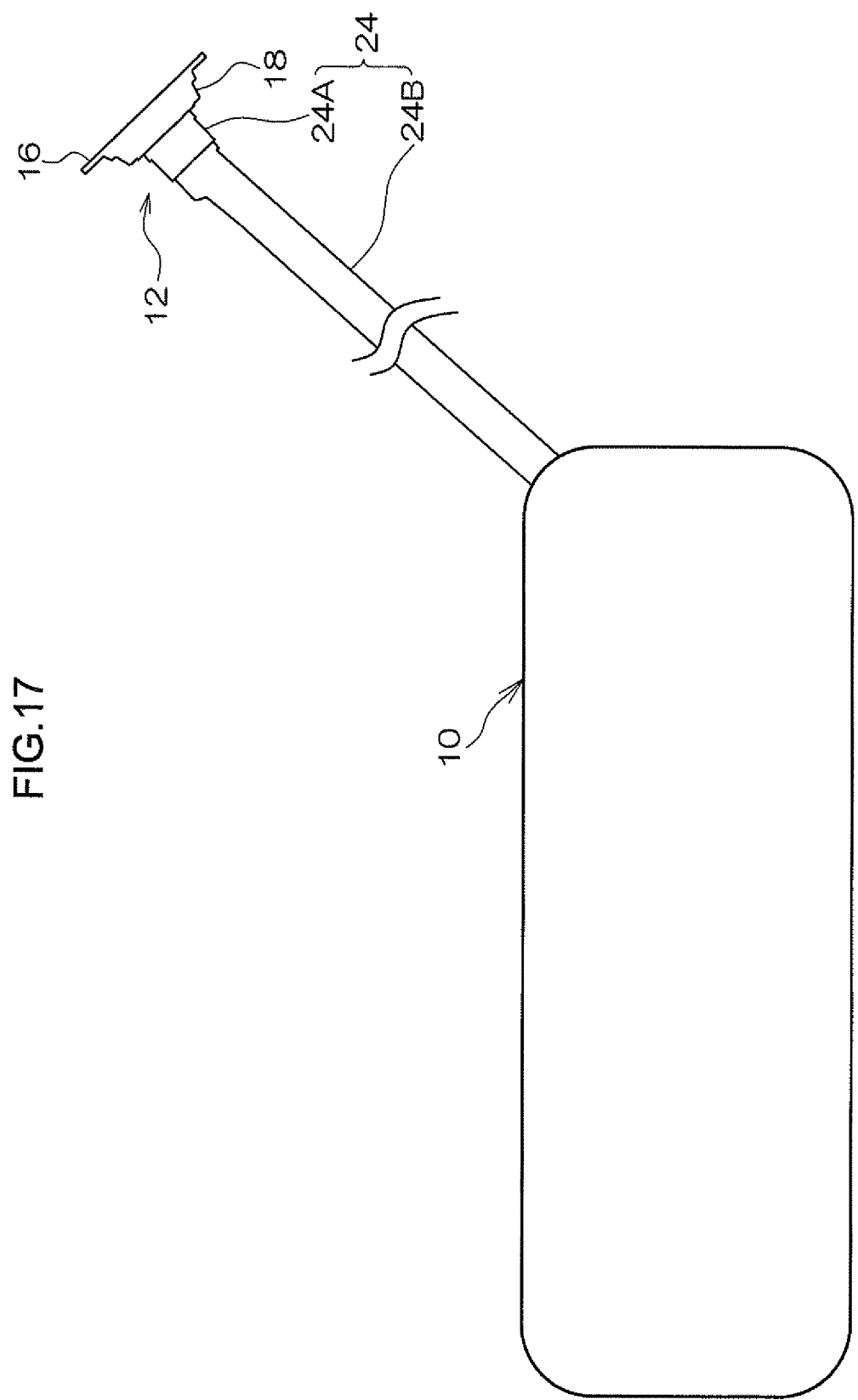
FIG. 17 is a schematic drawing showing the overall structure of a fuel tank to which the structure for a fuel filling section of a fuel tank of the present invention is applied.

A structure for a fuel filling section of a fuel tank (hereinafter simply called "fuel filling section structure") 12 of a first embodiment of the present invention is shown in FIG. 1. Further, a fuel tank 10, to which this fuel filling section structure 12 is applied, is shown in FIG. 17.

As shown in FIG. 1, a fuel filling section 14 that is structured as a so-called capless section is presented as an example in the present embodiment. An inlet box 18, that is locally recessed toward the inner side (the lower side in the drawing) is structured at an outer panel 16 of a vehicle body, and a mounting hole 20 is formed at the interior thereof. A filler pipe 24 is inserted through and fixed in the mounting hole 20 via an annular mounting ring 22.

Figure 2:
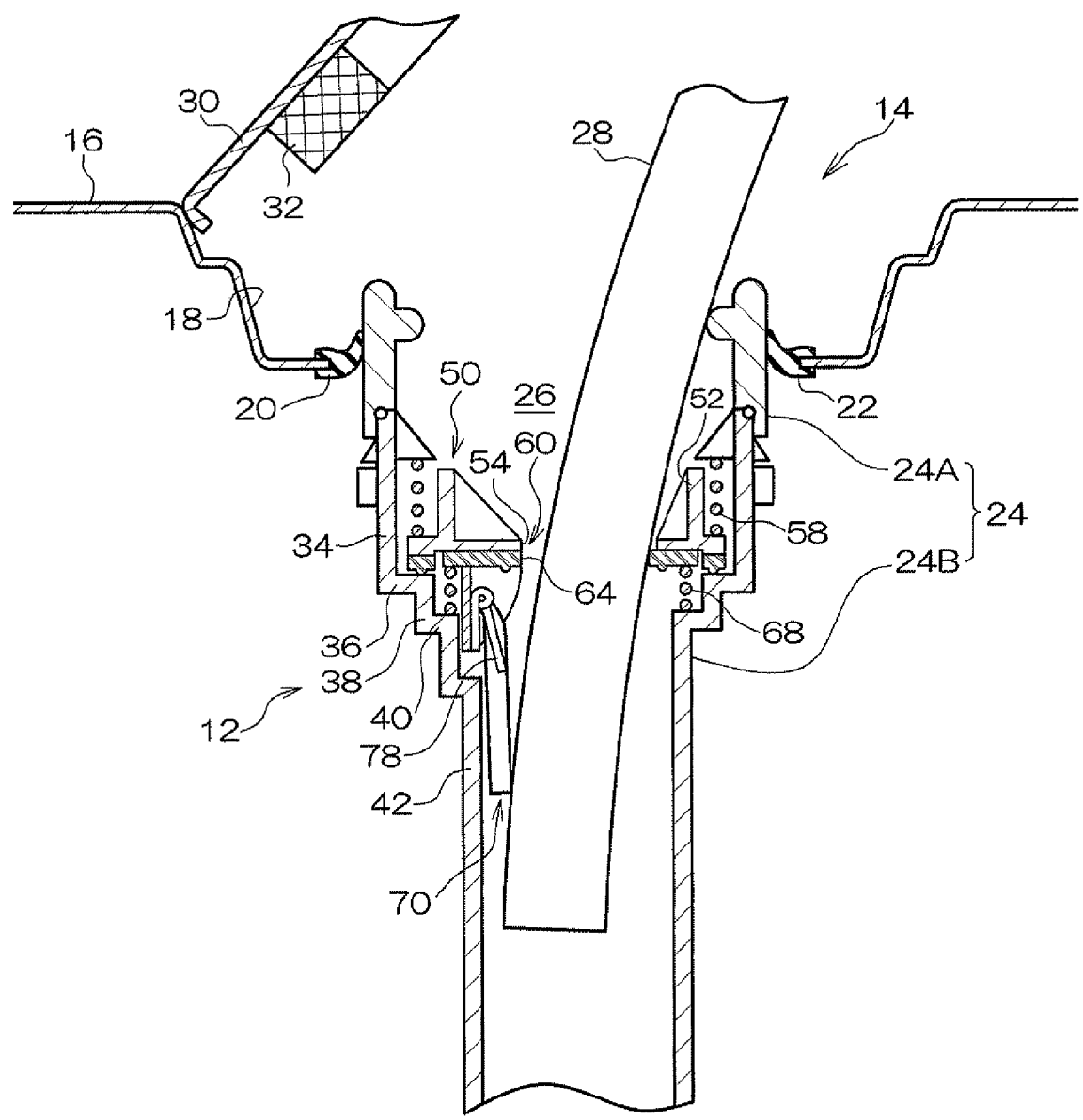
FIG. 2 is a cross-sectional view showing the structure for a fuel filling section of a fuel tank of the first embodiment of the present invention in a state in which a fuel filling gun is inserted.

The filler pipe 24 is structured by an outer pipe 24A at the outer panel 16 side, and an inner pipe 24B that is connected to the outer pipe 24A and positioned at the fuel tank 10 side (the lower side in FIG. 1). As shown in FIG. 17, the lower end of the inner pipe 24B is connected to the fuel tank 10. The interior of the filler pipe 24 is a fuel filling port 26, and, as shown in FIG. 2, a fuel filling gun 28 is inserted into the fuel filling port 26, and fuel can be filled into the fuel tank 10. In the present embodiment, in particular, the fuel filling gun 28 can be inserted easily by disposing a central line CL1 of the outer pipe 24A and a central line CL2 of the inner pipe 24B so as to be offset.

A lid 30 is provided at the inlet box 18 so as to be flush with the outer surface of the outer panel 16. The lid 30 is mounted by an unillustrated rotating member so as rotate with respect to the outer panel 16, and, by rotating, opens and closes the upper end portion of the outer pipe 24A, i.e., the fuel filling port 26. However, even in the state of closing the fuel filling port 26, a slight gap arises between the lid 30 and the outer panel 16. An annular filter 32 is mounted to the portion of the lid 30 that faces the outer panel 16, such that movement of foreign matter such as dust and moisture and the like is impeded and movement of vapor is permitted.

The diameter of the inner pipe 24B is reduced in stages from the portion connected with the outer pipe 24A toward the fuel tank 10, and a large diameter portion 34, a first step portion 36, an intermediate portion 38, a second step portion 40, and a small diameter portion 42 are structured in that order. Anchor claws 46, that are fixedly caught on anchor holes 44 of the outer pipe 24A are formed at the outer peripheral surface of the large diameter portion 34, and due thereto, the inner pipe 24B is connected to the outer pipe 24A so as to be unable to be removed therefrom.

A positive pressure valve 50 is provided at the inner side of the large diameter portion 34. The positive pressure valve 50 has a positive pressure valve main body 52 that is equipped with a plate-shaped plate portion 52P and a tube portion 52T that stands upwardly from the plate portion 52P. An insert-through hole 54 is formed at the substantial center of the plate portion 52P, and the fuel filling gun 28 can be inserted therethrough. Plural reinforcing pieces 52H, that are triangular in cross-section, stand radially between the plate portion 52P and the tube portion 52T so as to surround the insert-through hole 54, and the positive pressure valve main body 52 is reinforced. Further, inclined sides 52S of the reinforcing pieces 52H are inclined toward the insert-through hole 54, and have the function of guiding the fuel filling gun 28 to the insert-through hole 54.

Figure 4:
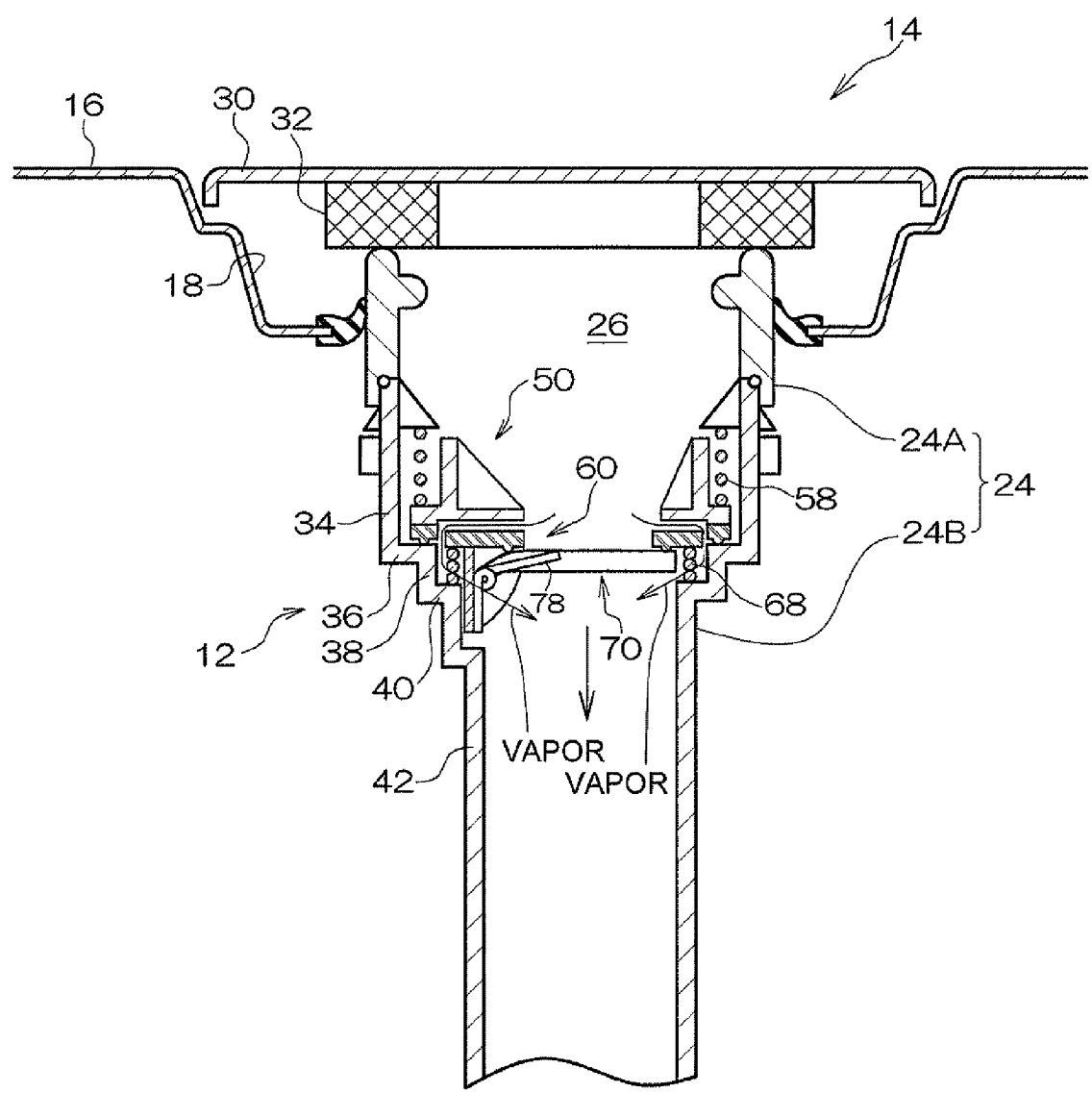
FIG. 4 is a cross-sectional view showing the structure for a fuel filling section of a fuel tank of the first embodiment of the present invention in a state in which the fuel tank interior has become negative pressure.

A rubber seal 56, that annularly contacts the first step portion 36, is mounted in a vicinity of the outer edge of the plate portion 52P. Further, the positive pressure valve main body 52 can move between a closed position at which the rubber seal 56 contacts the first step portion 36 as shown in FIG. 1, FIG. 2 and FIG. 4, and an open position at which the rubber seal 56 is apart from the first step portion 36 as shown in FIG. 4. Because the rubber seal 56 is apart from the first step portion 36 at the open position, movement of vapor therebetween is permitted, but, at the closed position, this movement of vapor is obstructed.

A spring 58 for the positive pressure valve is accommodated between the large diameter portion 34 and the tube portion 52T. One end of the spring 58 for the positive pressure valve contacts a spring receiving piece 59 formed at the inner side of the large diameter portion 34, and the other end contacts the outer edge portion of the plate portion 52P, respectively, and the spring 58 for the positive pressure valve urges the positive pressure valve main body 52 toward the closed position (downward in the drawing) by a predetermined urging force. Accordingly, usually, the positive pressure valve main body 52 that receives the urging force of the spring 58 for the positive pressure valve is supported at the first step portion 36, and is maintained at the closed position. Further, when the pressure within the fuel tank 10 rises (becomes positive pressure) and exceeds a predetermined value, the positive pressure valve main body 52 moves toward the open position against the urging force of the spring 58 for the positive pressure valve.

A negative pressure valve 60 is disposed at the fuel tank 10 side (the lower side in the drawing) of the positive pressure valve 50. The negative pressure valve 60 has a negative pressure valve main body 62 that is equipped with a plate-shaped plate portion 62P and a mounting piece 62H that stands at the fuel tank 10 side from a vicinity of the outer periphery of the plate portion 62P. An insert-through hole 64, that is similar to the plate portion 52P of the positive pressure valve main body 52, is formed in the plate portion 62P, and the fuel filling gun 28 can be inserted therethrough.

A rubber seal 66, that annularly contacts the plate portion 52P of the positive pressure valve main body 52, is mounted to a vicinity of the outer periphery of the plate portion 62P. Further, the negative pressure valve main body 62 can move between a closed position at which the rubber seal 66 contacts the plate portion 52P of the positive pressure valve main body 52 as shown in FIG. 1, and an open position at which the rubber seal 66 is apart from the plate portion 52P as shown in FIG. 4. Because the rubber seal 66 is apart from the plate portion 52P at the open position, movement of vapor therebetween is permitted, but, at the closed position, this movement of vapor is obstructed.

A spring 68 for the negative pressure valve is accommodated at the inner side of the intermediate portion 38 of the inner pipe 24B. One end of the spring 68 for the negative pressure valve contacts the second step portion 40, and the other end contacts the plate portion 62P, respectively, and the spring 68 for the negative pressure valve urges the negative pressure valve main body 62 toward the closed position (upward in the drawing) by a predetermined urging force. Further, the urging force of the spring 68 for the negative pressure valve is set to be smaller than the urging force of the spring 58 for the positive pressure valve. Accordingly, usually, the negative pressure valve main body 62 that receives the urging force of the spring 68 for the negative pressure valve is supported at the plate portion 52P of the positive pressure valve main body 52, and is maintained at the closed position. At this time, because the urging force of the spring 68 for the negative pressure valve is set to be smaller than the urging force of the spring 58 for the positive pressure valve, the positive pressure valve main body 52 does not move unintentionally. Further, when the pressure within the fuel tank 10 decreases (becomes negative pressure) and becomes less than a predetermined value, the negative pressure valve main body 62 moves toward the open position against the urging force of the spring 68 for the negative pressure valve.

A flap valve 70 is disposed at the fuel tank 10 side of the negative pressure valve 60. The flap valve 70 has a flap valve main body 72 of a shape that can close the insert-through holes 54, 64, and a supporting shaft 74 formed at the flap valve 70. The supporting shaft 74 is inserted in a shaft hole (not illustrated) that is formed in the mounting piece 62H of the negative pressure valve main body 62, and the flap valve main body 72 is supported by a so-called cantilevered structure such that it can rotate around the supporting shaft 74. Further, due to this rotation, the flap valve main body 72 moves between a closed position at which it closes the insert-through holes 54, 64 (i.e., the fuel filling port 26) as shown in FIG. 1, and an open position at which it opens the insert-through holes 54, 64 as shown in FIG. 2. Here, as can be understood from FIG. 1, when the flap valve main body 72 is at the closed position, the flap valve main body 72 contacts the plate portion 52P of the negative pressure valve main body 62 over the entire periphery at the periphery of the insert-through hole 64.

A spring 78 for the flap valve is installed at the supporting shaft 74. One end of the spring 78 for the flap valve contacts the flap valve main body 72, and the other end contacts the mounting piece 62H, and the spring 78 for the flap valve urges the flap valve main body 72 toward the closed position (in the counterclockwise direction in the drawing) by a predetermined urging force. The urging force of the spring 78 for the flap valve is set so as to be smaller than the pushing force applied from the fuel filling gun 28 that is inserted. Accordingly, usually, as shown in FIG. 1, the flap valve main body 72 that receives the urging force of the spring 78 for the flap valve is supported at the plate portion 62P of the negative pressure valve main body 62, and is maintained at the closed position. Further, as shown in FIG. 2, when pushed by the fuel filling gun 28, the flap valve main body 72 moves toward the open position against the urging force of the spring 78 for the flap valve. Note that an accommodating portion 80, that accommodates the mounting piece 62H and the spring 78 for the flap valve, is formed at the intermediate portion 38 of the inner pipe 24B. A gap is structured between the mounting piece 62H, and the accommodating portion 80 and the second step portion 40, and vapor can move therein.

In the fuel filling section structure 12 of the present embodiment that has such a structure, usually, as shown in FIG. 1, the flap valve main body 72 receives the urging force of the spring 78 for the flap valve, and maintains the closed position. Further, the negative pressure valve main body 62 also receives the urging force of the spring 68 for the negative pressure valve, and maintains the closed position. Moreover, the positive pressure valve main body 52 also receives the urging force of the spring 58 for the positive pressure valve, and maintains the closed position. Due thereto, the fuel filling port 26 also is closed.

At the time of filling fuel, as shown in FIG. 2, the lid 30 is opened, and the fuel filling gun 28 is inserted in the fuel filling port 26 (the insert-through holes 54, 64). Because the urging force of the spring 78 for the flap valve is set to be smaller than the pushing force that is applied from the fuel filling gun 28, and the flap valve 70 that is pushed by the fuel filling gun 28 rotates to the open position, the fuel filling gun 28 is inserted in deeper, and fuel filling can be carried out.

Here, generally, in the state in which fuel filling is not being carried out (the state shown in FIG. 1), there are cases in which the internal pressure of the fuel tank 10 becomes relatively high (becomes positive pressure) with respect to the pressure of the exterior, and conversely, cases in which it becomes low (becomes negative pressure).

Figure 3:
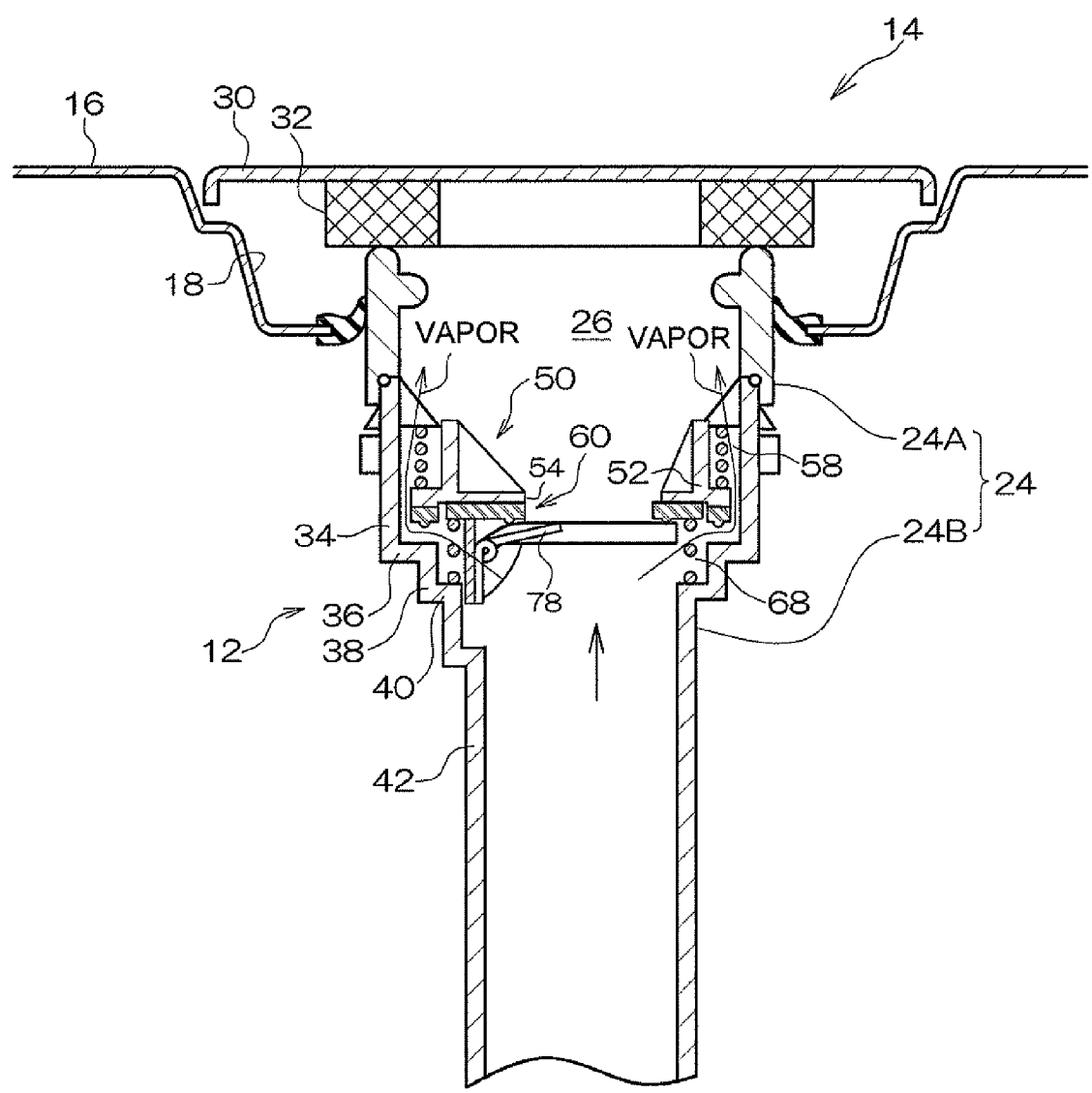
FIG. 3 is a cross-sectional view showing the structure for a fuel filling section of a fuel tank of the first embodiment of the present invention in a state in which a fuel tank interior has become positive pressure.

In the fuel filling section structure 12 of the present embodiment, because the spring 58 for the positive pressure valve urges the positive pressure valve main body 52 toward the closed position (downward in the drawing) by a predetermined urging force, when the pressure within the fuel tank 10 rises and exceeds a predetermined value, as shown in FIG. 3, the positive pressure valve main body 52 moves toward the open position against the urging force of the spring 58 for the positive pressure valve. Due thereto, the fuel filling port 26 is opened, and therefore, an excessive rise in the internal pressure of the fuel tank 10 can be suppressed. Note that, at this time, because the negative pressure valve main body 62 also is urged by the spring 68 for the negative pressure valve, the negative pressure valve main body 62 moves integrally with the positive pressure valve main body 52.

Further, in the fuel filling section structure 12 of the present embodiment, because the spring 68 for the negative pressure valve urges toward the negative pressure valve main body closed position (upward in the drawing) by a predetermined urging force, when the pressure within the fuel tank 10 decreases and becomes lower than a predetermined value, as shown in FIG. 4, the negative pressure valve main body 62 moves toward the open position against the urging force of the spring 68 for the negative pressure valve. Due thereto, the fuel filling port 26 is opened, and therefore, an excessive decrease in the internal pressure of the fuel tank 10 can be suppressed.

In this way, in the present embodiment, the operation of opening the fuel filling port 26 when the fuel tank 10 interior becomes negative pressure is carried out not by the flap valve 70, but by the negative pressure valve 60 that is set separately therefrom. Accordingly, the valve opening pressure of the flap valve 70 can be set without considering the valve opening operation at the time when the fuel tank 10 interior becomes negative pressure. Namely, because the valve opening pressure of the flap valve 70 can be set unrelated to the valve opening pressure of the negative pressure valve 60, the valve opening pressure of the flap valve 70 is set to be high, and the sealability when the flap valve main body 72 is at the closed position can be ensured to be high. Further, by setting the valve opening pressure of the flap valve 70 to be high, rattling when vibration or the like is applied to the flap valve main body 72 also can be suppressed, and the closed position (the sealed state) can be maintained.

Furthermore, in the fuel filling section structure 12 of the present embodiment, as can be understood from FIG. 1, when the flap valve main body 72 is at the closed position, the flap valve main body 72 contacts the plate portion 52P of the negative pressure valve main body 62 over the entire periphery at the periphery of the insert-through hole 64. Therefore, it is easy to ensure the sealability of the flap valve 70. Further, the pressure-receiving surface area of the negative pressure valve main body 62 also can be made to be large, and therefore, by setting the valve opening pressure of the negative pressure valve 60 to be low, the load applied when the fuel tank 10 interior becomes negative pressure also can be made to be low. In addition, by setting the valve opening pressure of the negative pressure valve 60 to be low in this way, the application of a large negative pressure to the fuel tank 10 is suppressed, and therefore, making the fuel tank 10 be high strength in order to withstand the negative pressure is not required.

Note that, in the fuel filling section structure 12 of the first embodiment, with regard to the positive pressure valve 50, the positive pressure valve main body 52 that receives the urging force of the spring 58 for the positive pressure valve is supported by the first step portion 36, and, with regard to the negative pressure valve 60, the negative pressure valve main body 62 that receives the urging force of the spring 68 for the negative pressure valve is structured so as to be supported by the positive pressure valve main body 52 (the plate portion 52P). For the negative pressure valve main body 62 as well, a member for supporting (e.g., a step portion or the like) may be provided, for example, at the inner pipe 24B, but, as described above, by supporting by the positive pressure valve main body 52, such a member for supporting is unnecessary, and simplification of the structure can be aimed for.

Figure 5:
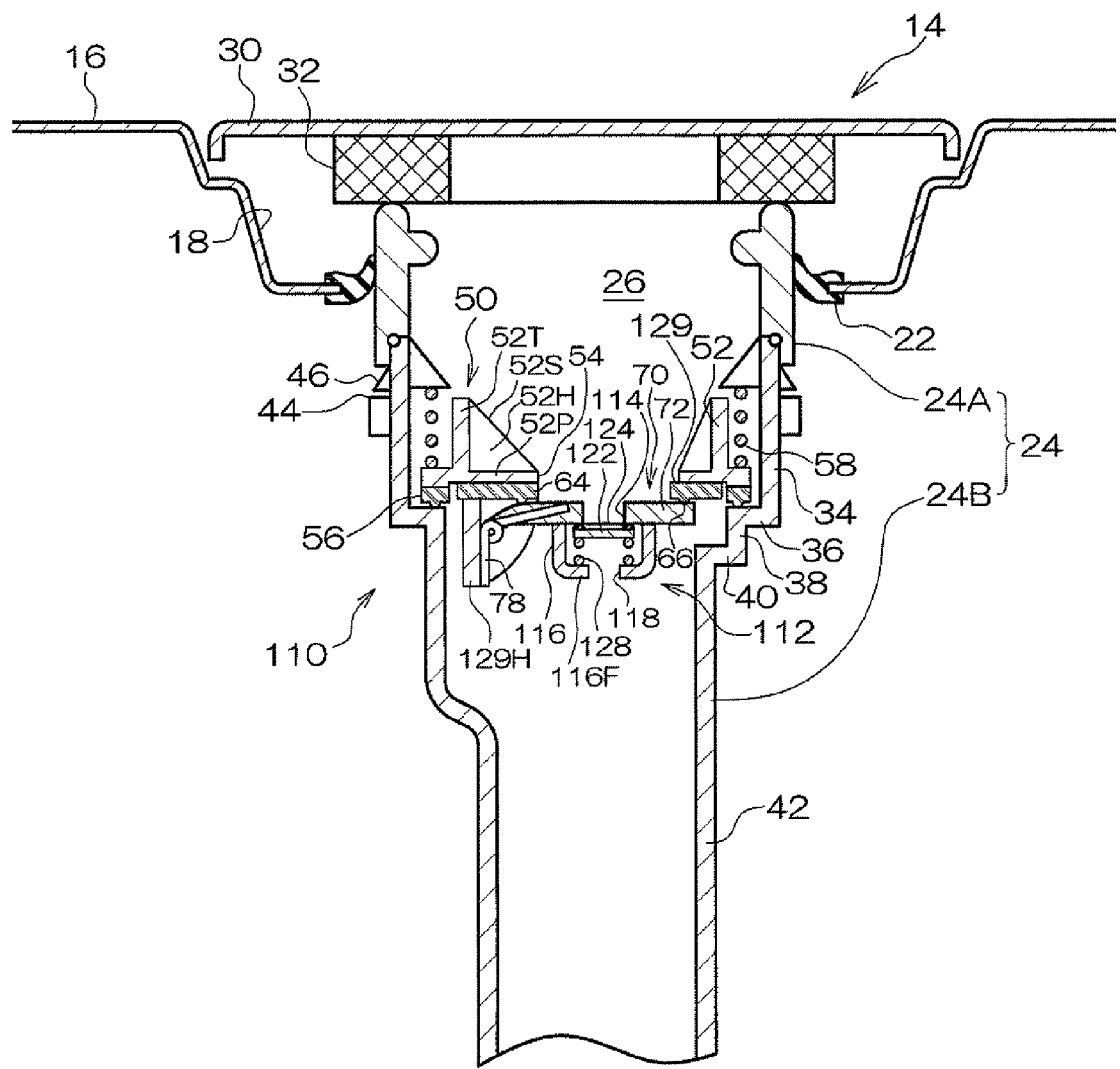
FIG. 5 is a cross-sectional view showing a structure for a fuel filling section of a fuel tank of a second embodiment of the present invention.

A fuel filling section structure 110 of a second embodiment of the present invention is shown in FIG. 5. This second embodiment is an example in which a negative pressure valve 112 is provided at the flap valve 70. Note that, in the following respective embodiments, structural elements, members and the like that are the same as the first embodiment are denoted by the same reference numerals, and detailed description thereof is omitted.

In the fuel filling section structure 110 of the second embodiment, a communication hole 114, that makes movement of vapor possible, is formed in the center of the flap valve 70, and the negative pressure valve 112 is provided at a position corresponding to the communication hole 114. This negative pressure valve 112 has a supporting tube 116 that is formed at the bottom surface (the fuel tank 10 side surface) of the flap valve 70, and a supporting flange 116F, that is annular and faces the flap valve in parallel, is formed at the lower end of the supporting tube 116. A communication hole 118, that makes movement of vapor possible, is set also in the center of the supporting flange 116F.

A negative pressure valve main body 122, that is plate-shaped and can close the communication hole 114, is disposed within the supporting tube 116. A rubber seal 124, that is annular and surrounds the communication hole 114, is mounted to the surface facing the flap valve main body 72 (the top surface in the drawing), in a vicinity of the outer periphery of the negative pressure valve main body 122. Further, the negative pressure valve main body 62 can move between a closed position at which the rubber seal 124 contacts the flap valve main body 72, and an open position at which the rubber seal 124 is apart from the flap valve main body 72.

A spring 128 for the negative pressure valve is disposed between the negative pressure valve main body 122 and the supporting flange 116F, and urges the negative pressure valve main body 122 toward the closed position by a predetermined urging force.

Note that, in the second embodiment, the negative pressure valve 112 is provided at the flap valve 70 in this way. Therefore, instead of the negative pressure valve 60 (see FIG. 1) of the first embodiment, a supporting plate 129 that is annular is disposed between the positive pressure valve 50 and the flap valve 70, and is fixed to the positive pressure valve 50. A mounting piece 129H, that is similar to the mounting piece 62H of the first embodiment, is formed at the supporting plate 129, and the flap valve main body 72 moves between the closed position and the open position. Further, the flap valve main body 72 is urged toward the closed position by the spring 78 for the flap valve.

Also in the fuel filling section structure 110 of the second embodiment that has such a structure, in the same way as the fuel filling section structure 12 of the first embodiment, usually, as shown in FIG. 5, the flap valve main body 72 receives the urging force of the spring 78 for the flap valve, and maintains the closed position. Further, the negative pressure valve main body 122 receives the urging force of the spring 128 for the negative pressure valve and the positive pressure valve main body 52 receives the urging force of the spring 58 for the positive pressure valve, respectively, and they maintain the closed positions. Due thereto, the fuel filling port 26 also is closed.

Figure 6:
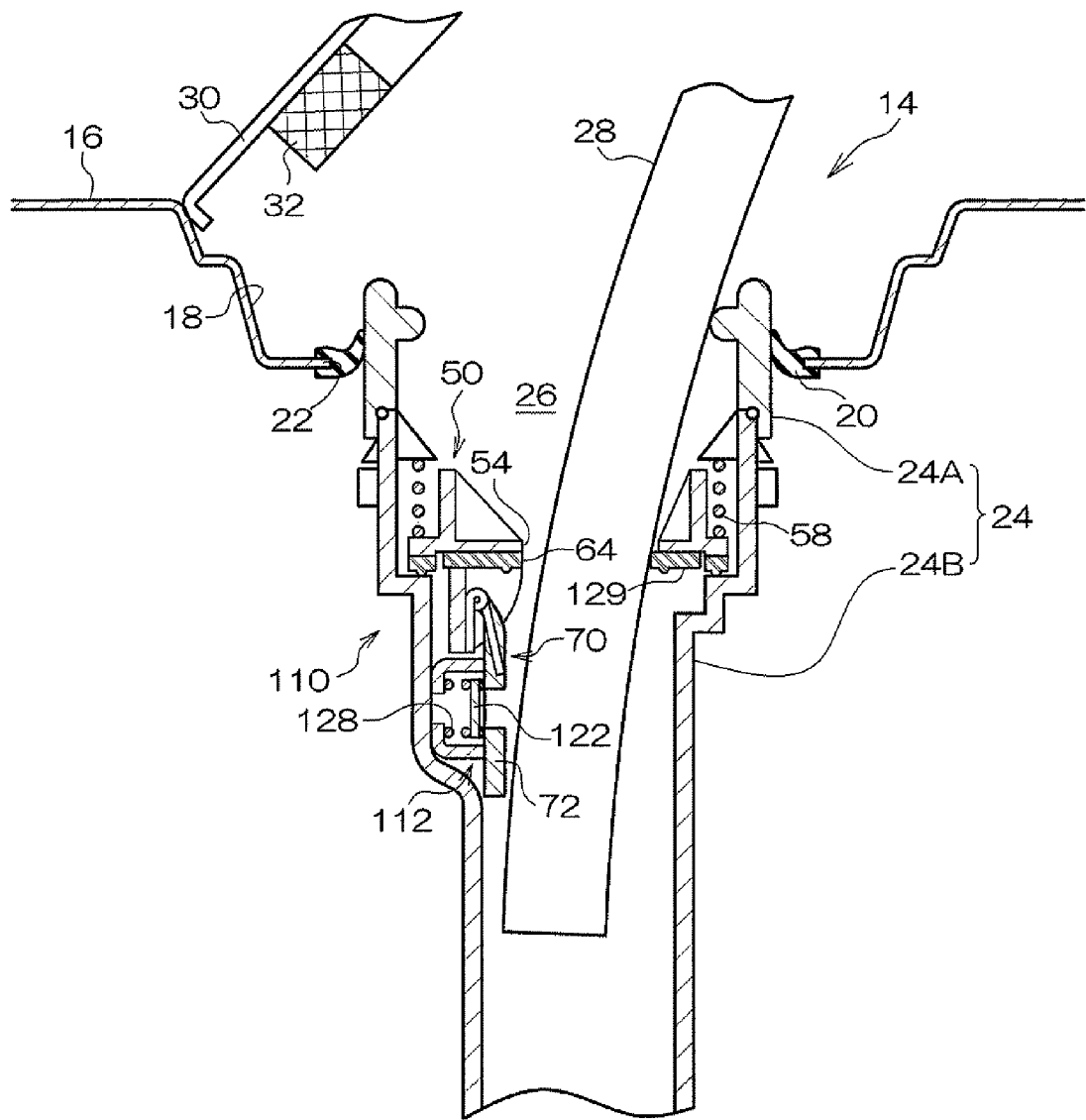
FIG. 6 is a cross-sectional view showing the structure for a fuel filling section of a fuel tank of the second embodiment of the present invention in a state in which a fuel filling gun is inserted.

At the time of filling fuel, as shown in FIG. 6, the lid 30 is opened, and the fuel filling gun 28 is inserted in the fuel filling port 26 (the insert-through hole 54). Because the flap valve 70 that is pushed by the fuel filling gun 28 rotates to the open position, the fuel filling gun 28 is inserted in deeper, and fuel filling can be carried out. At this time, in the second embodiment, because the negative pressure valve 112 is provided at the bottom surface of the flap valve 70, the pushing force of the fuel filling gun 28 is not applied to the negative pressure valve 112. Accordingly, the negative pressure valve 112 is not pushed by the fuel filling gun 28, and the negative pressure valve main body 122 does not move to the open position.

Figure 7:
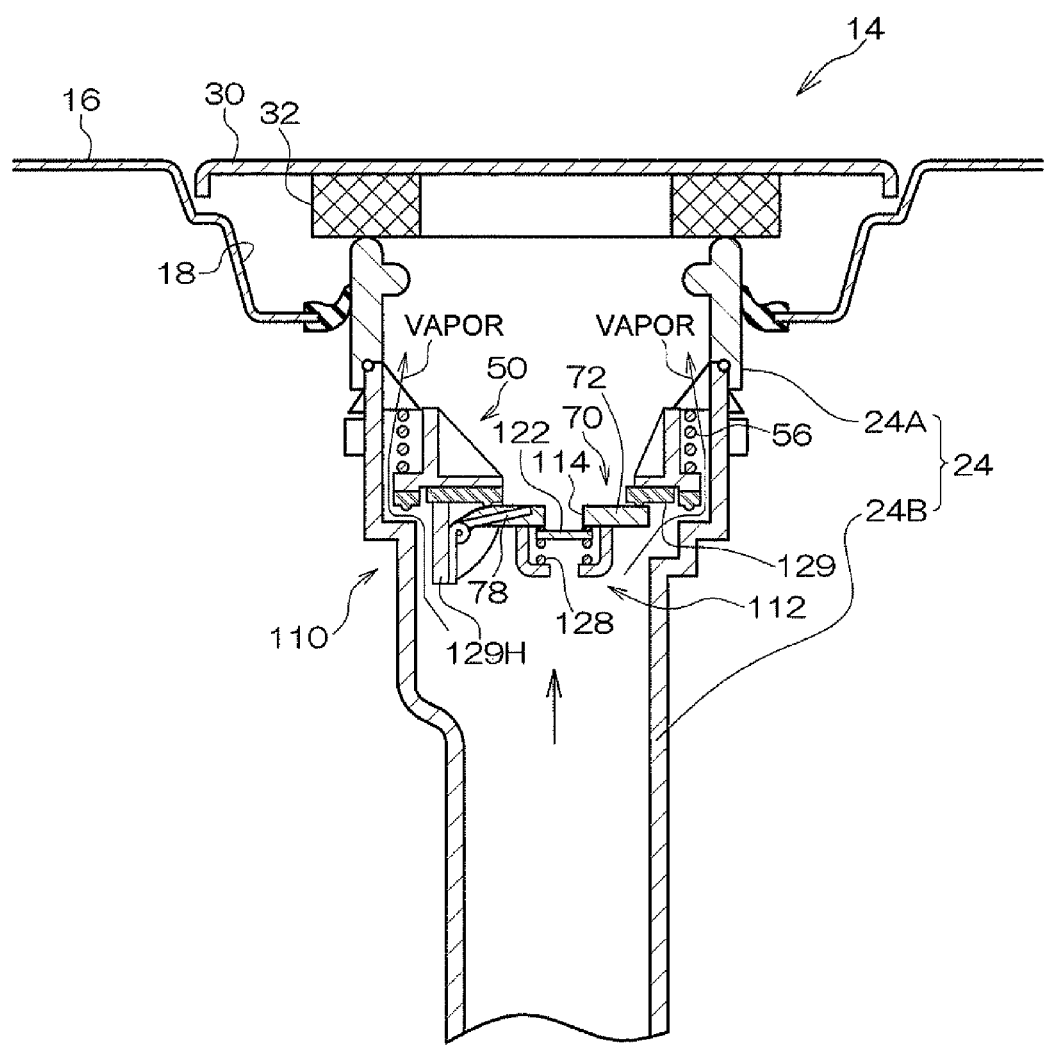
FIG. 7 is a cross-sectional view showing the structure for a fuel filling section of a fuel tank of the second embodiment of the present invention in a state in which a fuel tank interior has become positive pressure.

When the pressure within the fuel tank 10 rises and exceeds a predetermined value, as shown in FIG. 7, the positive pressure valve main body 52 moves toward the open position, and therefore, the fuel filling port 26 is opened, and an excessive rise in the internal pressure of the fuel tank 10 can be suppressed.

Figure 8:
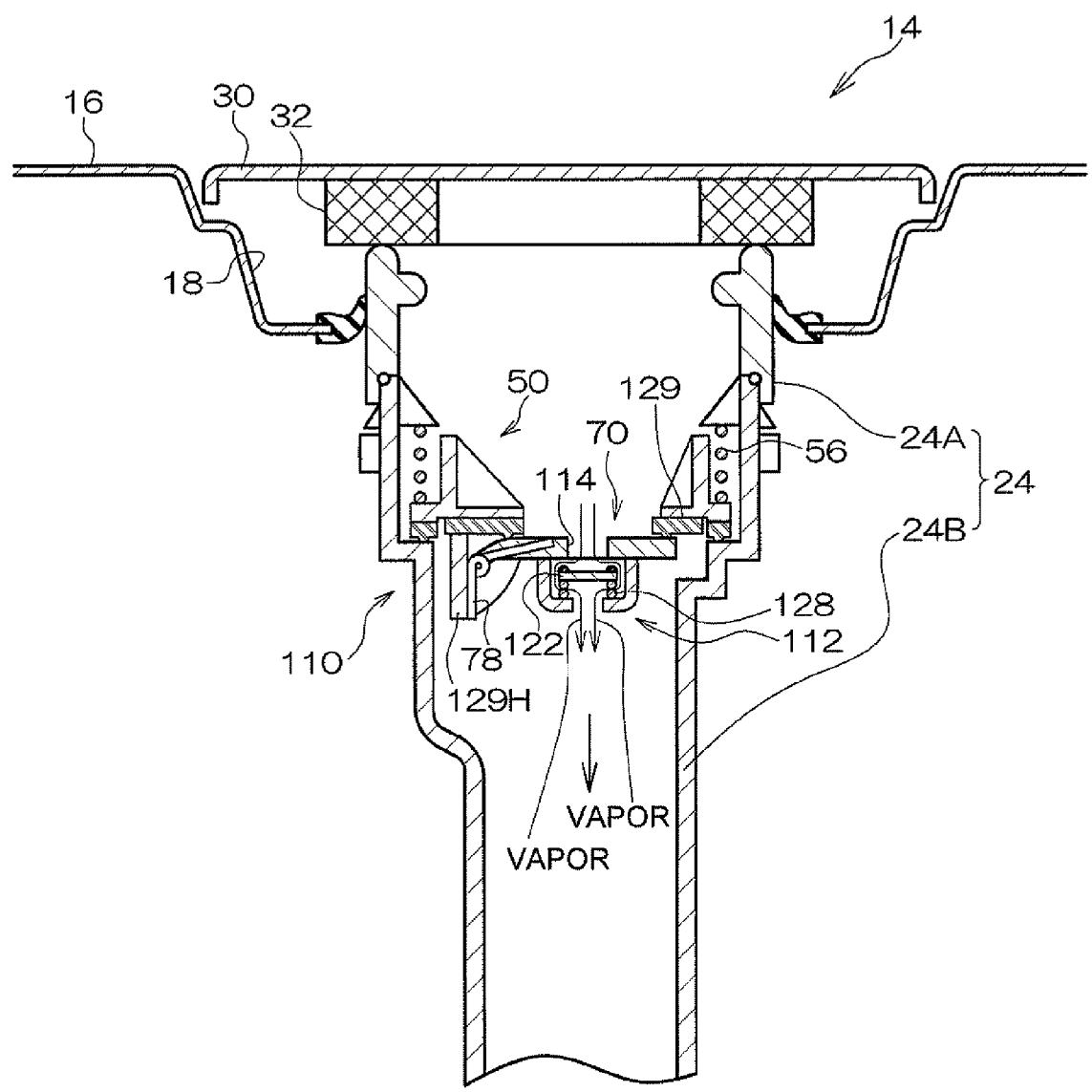
FIG. 8 is a cross-sectional view showing the structure for a fuel filling section of a fuel tank of the second embodiment of the present invention in a state in which the fuel tank interior has become negative pressure.

Further, when the pressure within the fuel tank 10 decreases and becomes lower than a predetermined value, as shown in FIG. 8, the negative pressure valve main body 122 moves toward the open position, and therefore, the fuel filling port 26 is opened, and an excessive decrease in the internal pressure of the fuel tank 10 can be suppressed.

Figure 9:
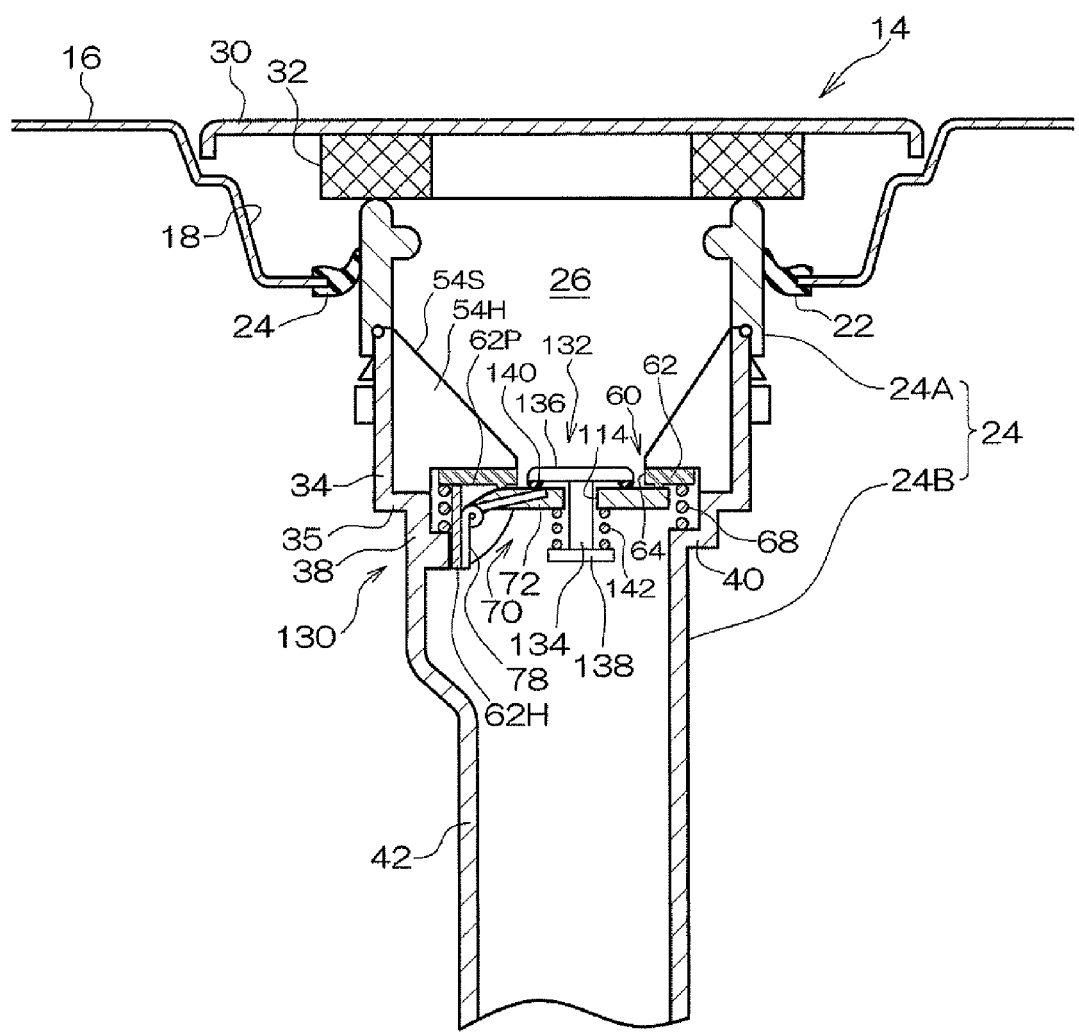
FIG. 9 is a cross-sectional view showing a structure for a fuel filling section of a fuel tank of a third embodiment of the present invention.

A fuel filling section structure 130 of a third embodiment of the present invention is shown in FIG. 9. The third embodiment is an example in which a positive pressure valve 132 is provided at the flap valve 70. In the third embodiment, structural elements, members and the like that are the same as the first embodiment or the second embodiment are denoted by the same reference numerals, and detailed description thereof is omitted.

In the fuel filling section structure 130 of the third embodiment, the communication hole 114 is formed in the center of the flap valve 70 in substantially the same way as the second embodiment, and the positive pressure valve 132 is provided at a position corresponding to this communication hole 114. The positive pressure valve 132 has a sliding shaft 134 that is cylindrical and is inserted through the communication hole 114, a positive pressure valve main body 136 that is disk-shaped and is formed at the upper end (the lid 30 side end portion) of the sliding shaft 134, and a supporting plate 138 that is disk-shaped and is formed at the lower end (the fuel tank 10 side end portion) of the sliding shaft 134. Further, the outer diameter of the sliding shaft 134 is set to be smaller than the inner diameter of the communication hole 114, and a gap arises between the sliding shaft 134 and the communication hole 114.

The outer diameter of the positive pressure valve main body, 136 is set to be larger than the inner diameter of the communication hole 114. A rubber seal 140, that is annular and faces the flap valve main body 72, is mounted in a vicinity of the outer periphery of the positive pressure valve main body 136. The positive pressure valve main body 136 can move between a closed position at which the rubber seal 140 contacts the flap valve main body 72, and an open position at which the rubber seal 140 is apart from the flap valve main body 72.

The outer diameter of the supporting plate 138 is set to be larger than the inner diameter of the communication hole 114. A spring 142 for the positive pressure valve is disposed between the supporting plate 138 and the flap valve main body 72, and, via the supporting plate 138 and the sliding shaft 134, urges the positive pressure valve main body 136 toward the closed position (downward in the drawing) by a predetermined urging force.

Note that, in the third embodiment, because the positive pressure valve 132 is provided at the flap valve 70 in this way, the positive pressure valve 50 (see FIG. 1) of the first embodiment is not provided. Accordingly, as can be understood from FIG. 9 as well, the reinforcing pieces 52H are formed directly at the inner side of the large diameter portion 34 of the inner pipe 24A.

Also in the fuel filling section structure 130 of the third embodiment that has such a structure, in the same way as the fuel filling section structure 12 of the first embodiment, usually, as shown in FIG. 9, the flap valve main body 72 receives the urging force of the spring 78 for the flap valve, and maintains the closed position. Further, the negative pressure valve main body 62 receives the urging force of the spring 68 for the negative pressure valve and the positive pressure valve main body 136 receives the urging force of the spring 142 for the positive pressure valve, respectively, and they maintain the closed positions. Due thereto, the fuel filling port 26 also is closed.

Figure 10:
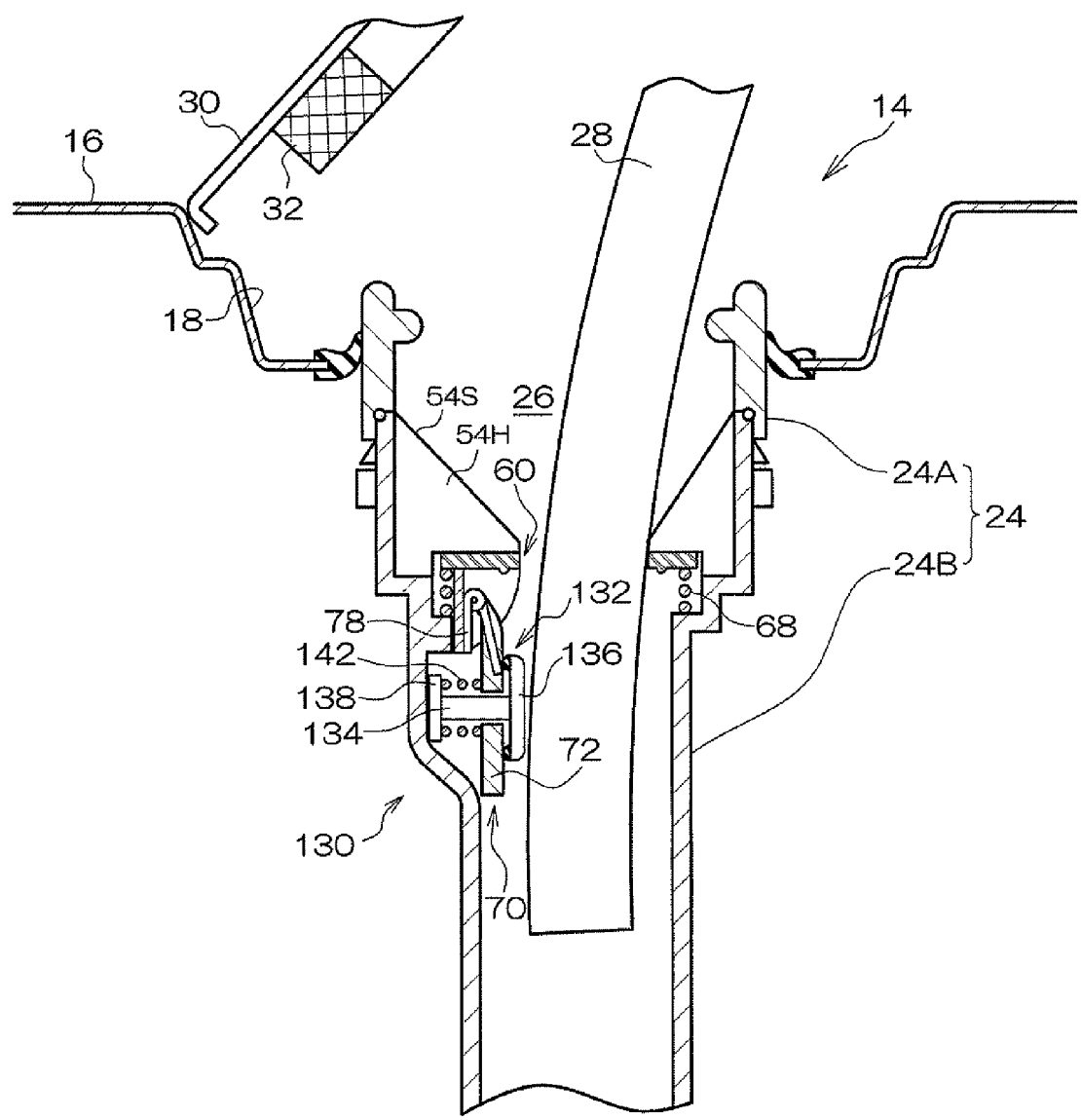
FIG. 10 is a cross-sectional view showing the structure for a fuel filling section of a fuel tank of the third embodiment of the present invention in a state in which a fuel filling gun is inserted.

At the time of filling fuel, as shown in FIG. 10, the lid 30 is opened, and the fuel filling gun 28 is inserted in the fuel filling port 26 (the insert-through hole 54). Because the flap valve 70 that is pushed by the fuel filling gun 28 rotates to the open position, the fuel filling gun 28 is inserted in deeper, and fuel filling can be carried out.

Figure 11:
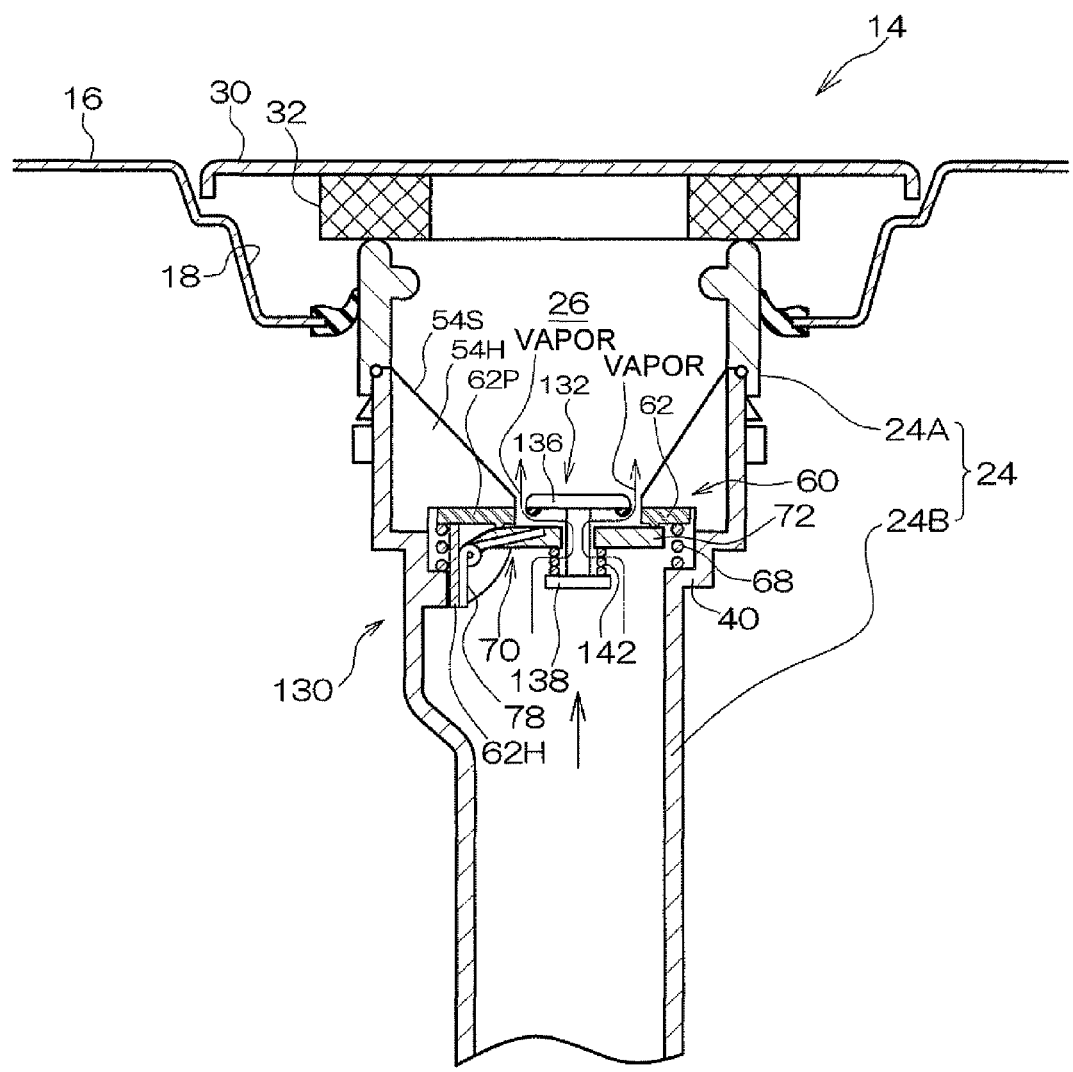
FIG. 11 is a cross-sectional view showing the structure for a fuel filling section of a fuel tank of the third embodiment of the present invention in a state in which a fuel tank interior has become positive pressure.

When the pressure within the fuel tank 10 rises and exceeds a predetermined value, as shown in FIG. 11, the positive pressure valve main body 136 moves toward the open position, and therefore, the fuel filling port 26 is opened, and an excessive rise in the internal pressure of the fuel tank 10 can be suppressed.

Figure 12:
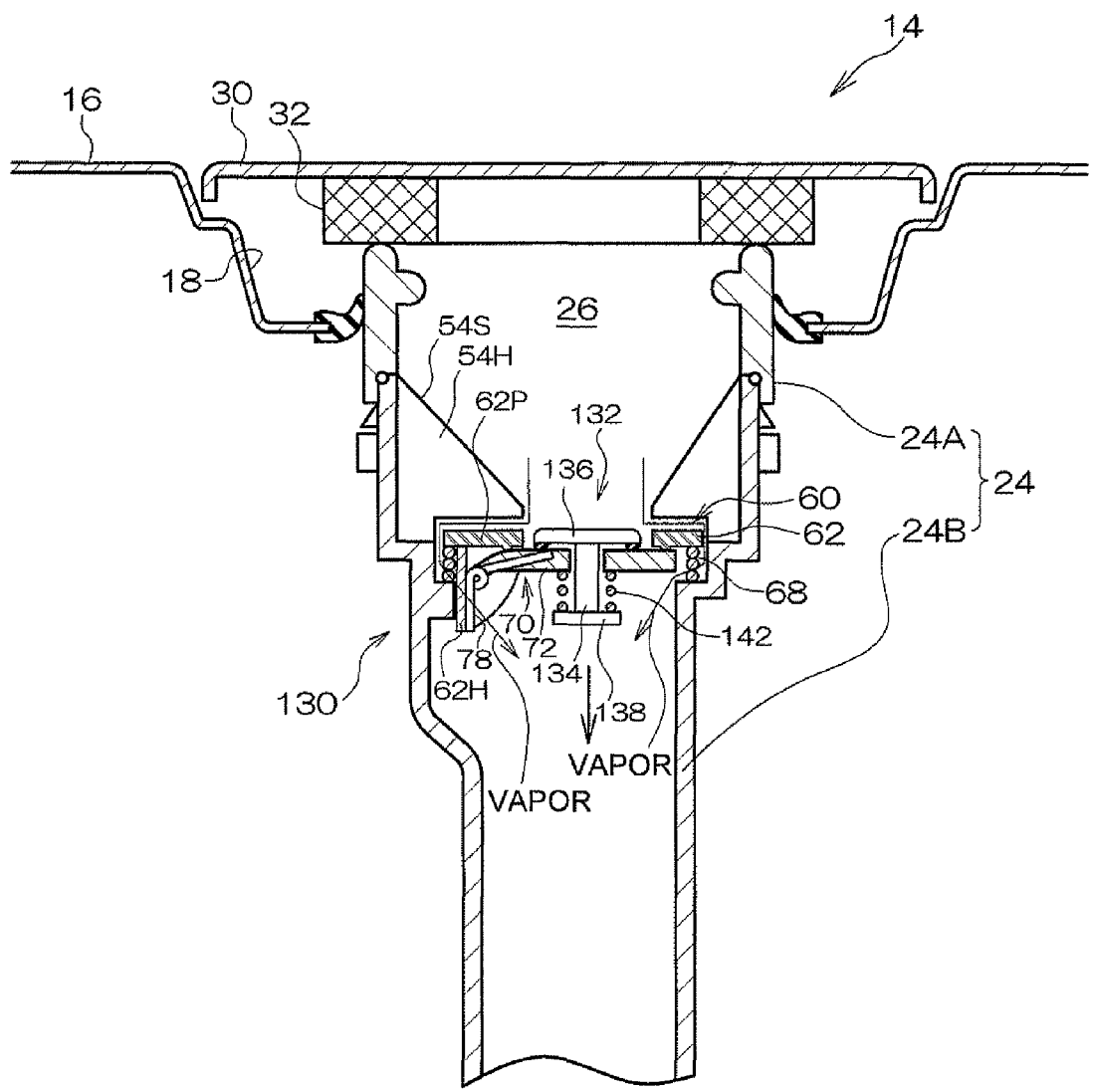
FIG. 12 is a cross-sectional view showing the structure for a fuel filling section of a fuel tank of the third embodiment of the present invention in a state in which the fuel tank interior has become negative pressure.

Further, when the pressure within the fuel tank 10 decreases and becomes lower than a predetermined value, as shown in FIG. 12, the negative pressure valve main body 62 moves toward the open position, and therefore, the fuel filling port 26 is opened, and an excessive decrease in the internal pressure of the fuel tank 10 can be suppressed.

Figure 13:
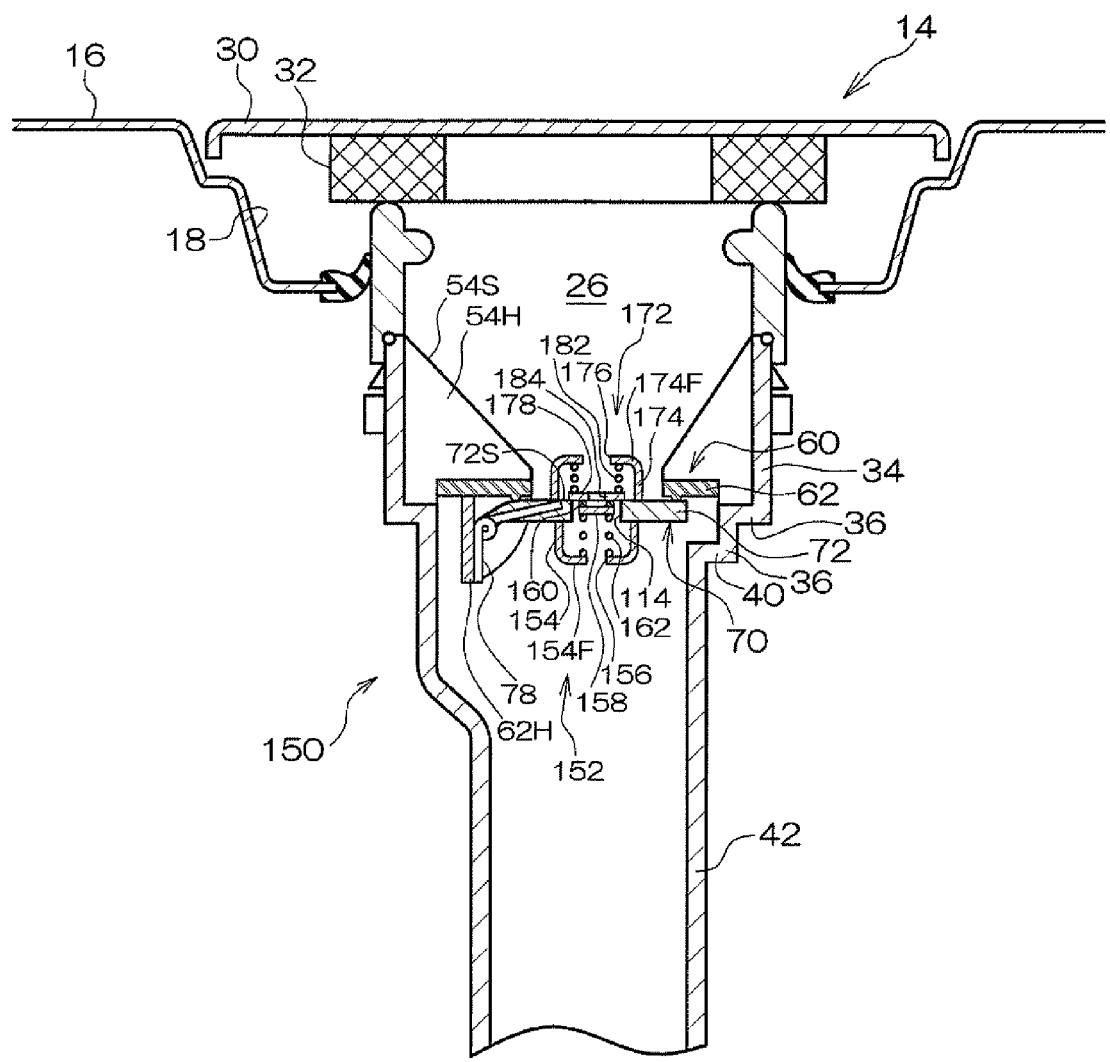
FIG. 13 is a cross-sectional view showing a structure for a fuel filling section of a fuel tank of a fourth embodiment of the present invention.

A fuel filling section structure 150 of a fourth embodiment of the present invention is shown in FIG. 13. The fourth embodiment is an example in which both a negative pressure valve 152 and a positive pressure valve 172 are provided at the flap valve 70. In the fourth embodiment, structural elements, members and the like that are the same as the first embodiment through the third embodiment are denoted by the same reference numerals, and detailed description thereof is omitted.

In the fuel filling section structure 150 of the fourth embodiment, the communication hole 114 is formed in the center of the flap valve 70, and the negative pressure valve 152 is provided at a position corresponding to the communication hole 114 of the bottom surface (the fuel tank 10 side surface) of the flap valve 70, and the positive pressure valve 172 is provided at a position corresponding to the communication hole 114 of the top surface (the lid 30 side surface) of the flap valve 70.

The negative pressure valve 152 has a supporting tube 154 that is formed at the bottom surface (the fuel tank 10 side surface) of the flap valve 70, and a supporting flange 154F, that is annular and faces the flap valve main body 72 in parallel, is formed at the lower end of the supporting tube 154. A communication hole 156, that makes movement of vapor possible, is formed also in the center of the supporting flange 154F. Note that the inner diameter of the supporting tube 154 is either substantially equal to the inner diameter of the communication hole 114, or is made to be a slightly larger extent.

Further, the positive pressure valve 172 has a supporting tube 174 that is formed at the top surface (the lid 30 side surface) of the flap valve 70, and a supporting flange 174F, that is annular and faces the flap valve main body 72 in parallel, is formed at the upper end of the supporting tube 174. A communication hole 176, that makes movement of vapor possible, is formed also in the center of the supporting flange 174F. Note that the inner diameter of the supporting tube 174 is made to be larger than the inner diameter of the communication hole 114, and the portion at the flap valve main body 72 that is further toward the inner side than the supporting tube 174 is a supporting surface 72S.

A positive pressure valve main body 178 is disposed at the interior of the supporting tube 174. The positive pressure valve main body 178 is formed to have a larger diameter than the communication hole 114, and a rubber seal (not shown), that is annular and faces the flap valve main body 72, is mounted to a vicinity of the outer periphery so as to surround the communication hole 114. The positive pressure valve main body 178 can move between a closed position at which this rubber seal contacts the flap valve main body 72, and an open position at which the rubber seal is apart from the flap valve main body 72. Further, a communication hole 184, that has a smaller diameter than a negative pressure valve main body 158 that will be described later, is formed in the center of the positive pressure valve main body 178.

A spring 182 for the positive pressure valve is accommodated between the positive pressure valve main body 178 and the supporting flange 174F. One end thereof contacts the positive pressure valve main body 178, and the other end contacts the supporting flange 174F, and the spring 182 for the positive pressure valve urges the positive pressure valve main body 178 to the closed position.

In contrast, the negative pressure valve main body 158, that has a larger diameter than the communication hole 184 of the positive pressure valve main body 178 and a smaller diameter than the communication hole 114 of the flap valve main body 72, is disposed at the interior of a supporting tube 154 that is formed at the bottom surface of the flap valve main body 72, and a gap arises between the outer periphery of the negative pressure valve main body 158 and the inner periphery of the communication hole 114. A rubber seal 160, that opposes the positive pressure valve main body 178, is mounted to a vicinity of the outer periphery of the negative pressure valve main body 158 so as to surround the communication hole 184. The negative pressure valve main body 158 can move between a closed position at which the rubber seal 160 contacts the positive pressure valve main body 178, and an open position at which the rubber seal 160 is apart from the positive pressure valve main body 178.

A spring 162 for the negative pressure valve is accommodated between the negative pressure valve main body 158 and the supporting flange 154F. One end thereof contacts the negative pressure valve main body 158, and the other end contacts the supporting flange 154F, and the spring 162 for the negative pressure valve urges the negative pressure valve main body 158 to the closed position. The urging force of the spring 162 for the negative pressure valve is set to be smaller than the urging force of the spring 182 for the positive pressure valve.

Note that, in the fourth embodiment, because the positive pressure valve 172 and the negative pressure valve 152 are provided at the flap valve 70 in this way, the positive pressure valve 50 and the negative pressure valve 60 (see FIG. 1) of the first embodiment are not provided.

Also in the fuel filling section structure 150 of the fourth embodiment that has such a structure, in the same way as the fuel filling section structure 12 of the first embodiment, usually, as shown in FIG. 13, the flap valve main body 72 receives the urging force of the spring 78 for the flap valve, and maintains the closed position. Further, the positive pressure valve main body 178 receives the urging force of the spring 182 for the positive pressure valve and the negative pressure valve main body 158 receives the urging force of the spring 162 for the negative pressure valve respectively, and they maintain the closed positions. Due thereto, the fuel filling port 26 also is closed. In particular, in the fourth embodiment, because the urging force of the spring 182 for the positive pressure valve is set to be larger than the urging force of the spring 162 for the negative pressure valve, the positive pressure valve main body 178 does not move to the open positive unintentionally due to the urging force of the spring 162 for the negative pressure valve.

Figure 14:
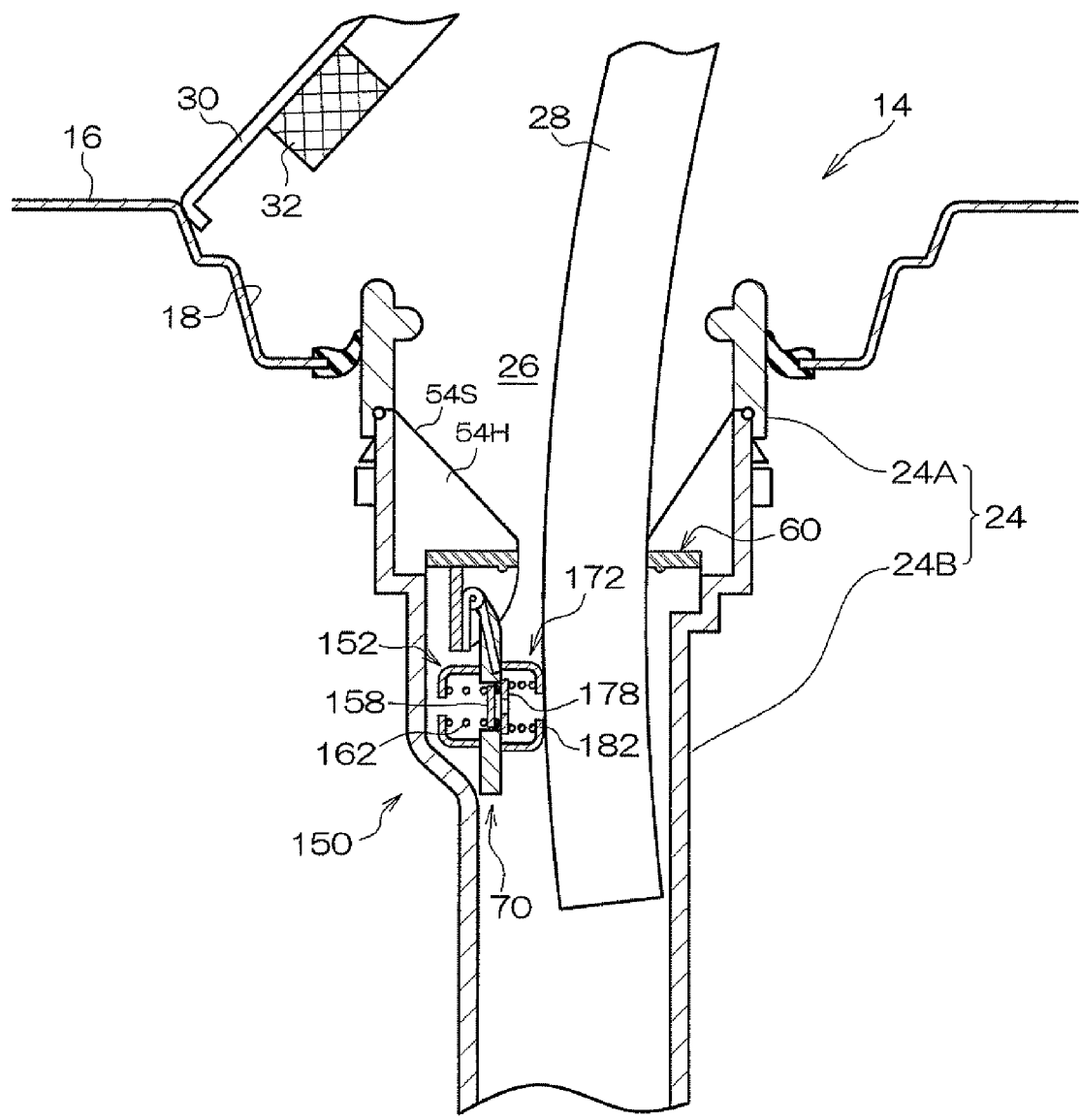
FIG. 14 is a cross-sectional view showing the structure for a fuel filling section of a fuel tank of the fourth embodiment of the present invention in a state in which a fuel filling gun is inserted.

At the time of filling fuel, as shown in FIG. 14, the lid 30 is opened, and the fuel filling gun 28 is inserted in the fuel filling port 26. Because the flap valve 70 that is pushed by the fuel filling gun 28 rotates to the open position, the fuel filling gun 28 is inserted in deeper, and fuel filling can be carried out.

Figure 15:
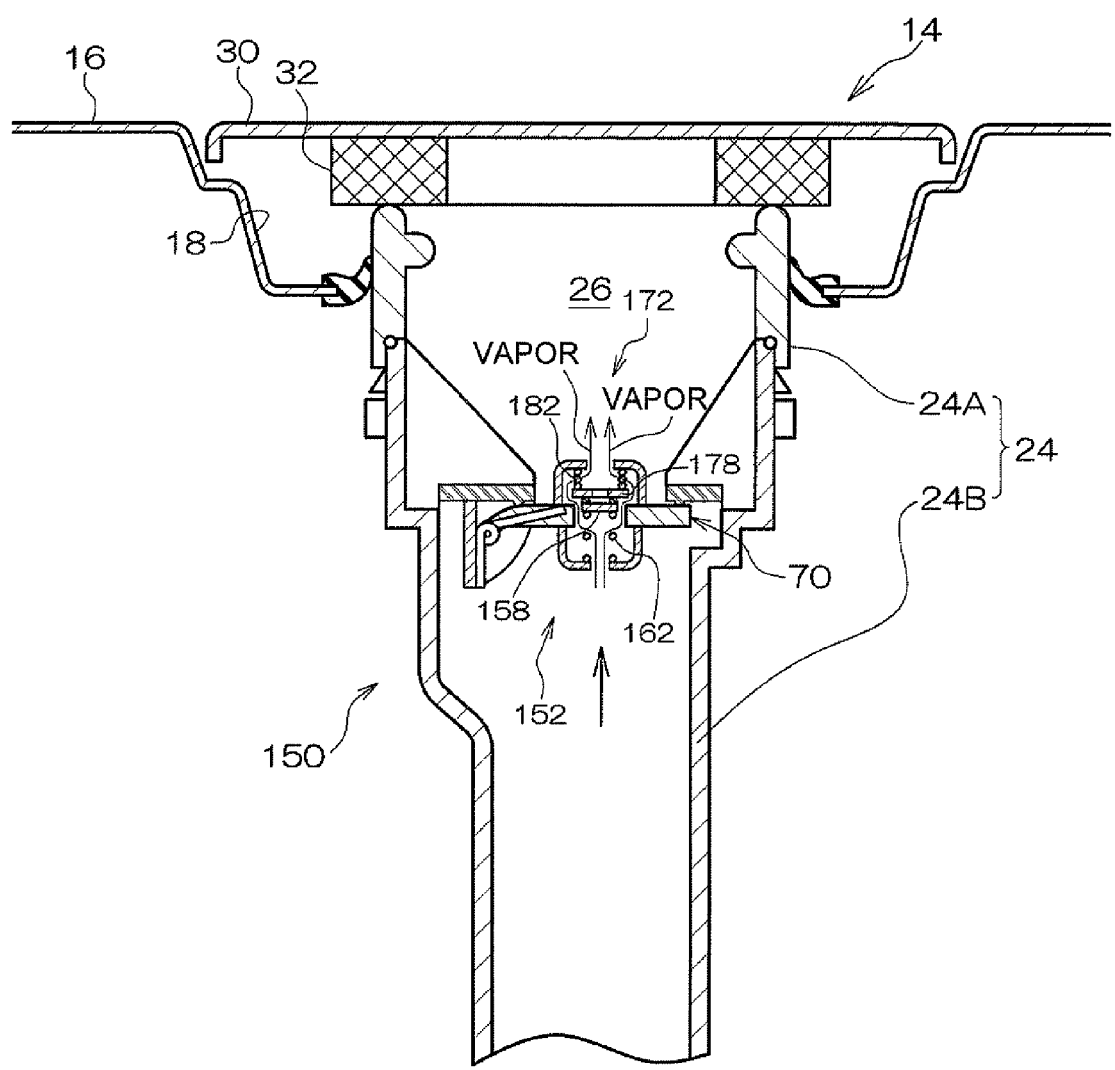
FIG. 15 is a cross-sectional view showing the structure for a fuel filling section of a fuel tank of the fourth embodiment of the present invention in a state in which a fuel tank interior has become positive pressure.

When the pressure within the fuel tank 10 rises and exceeds a predetermined value, as shown in FIG. 15, the positive pressure valve main body 136 moves toward the open position, and therefore, vapor can move between the positive pressure valve main body 178 and the flap valve 70. Namely, the fuel filling port 26 is opened, and an excessive rise in the internal pressure of the fuel tank 10 can be suppressed. Note that, at this time, the negative pressure valve main body 158 as well, that is urged by the spring 162 for the negative pressure valve, moves together with the positive pressure valve main body 178.

Figure 16:
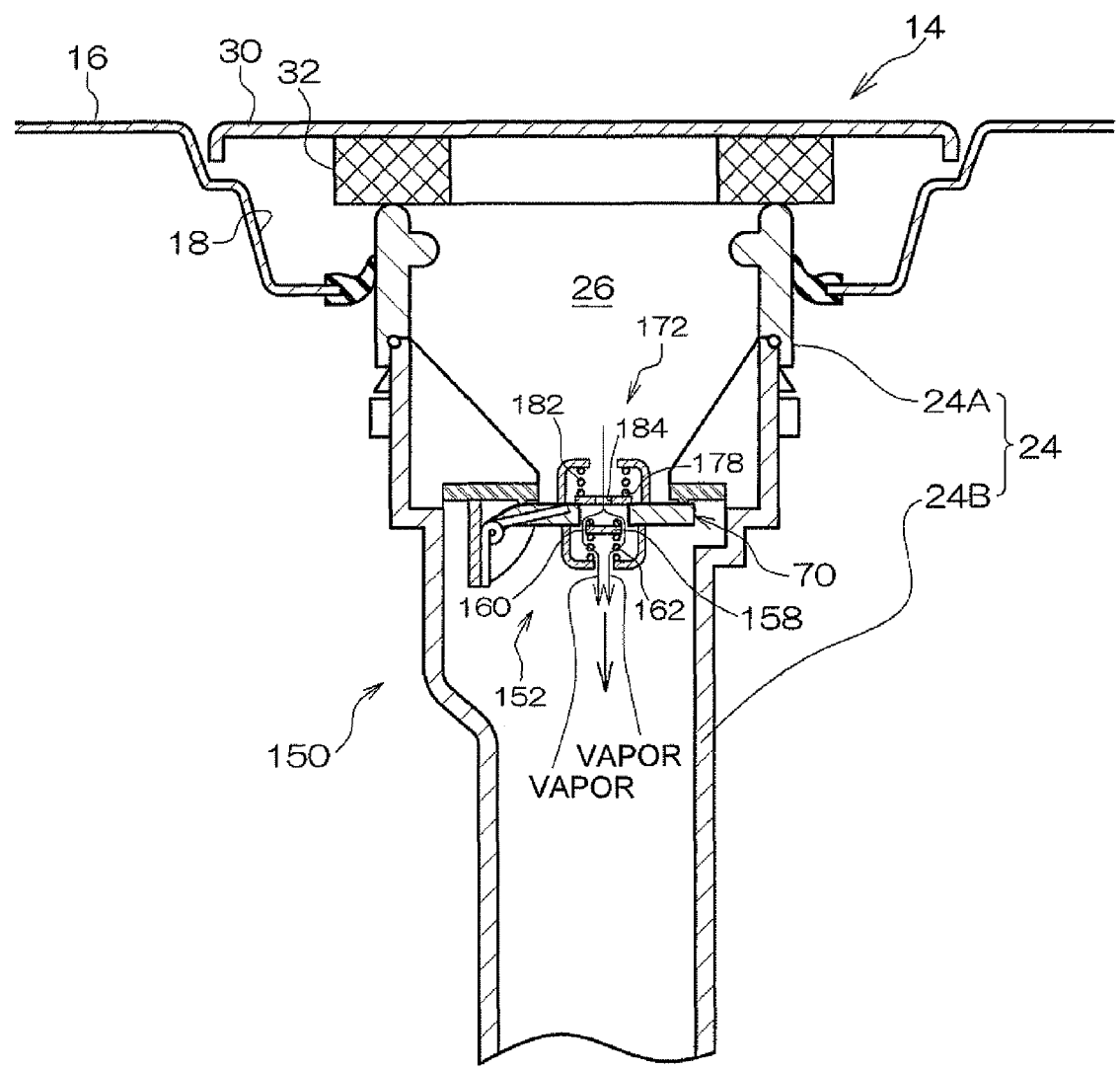
FIG. 16 is a cross-sectional view showing the structure for a fuel filling section of a fuel tank of the fourth embodiment of the present invention in a state in which the fuel tank interior has become negative pressure.

Further, when the pressure within the fuel tank 10 decreases and becomes lower than a predetermined value, as shown in FIG. 16, the negative pressure valve main body 62 moves toward the open position, and therefore, vapor can move through the communication hole 184 of the positive pressure valve main body 178. Namely, the fuel filling port 26 is opened, and an excessive decrease in the internal pressure of the fuel tank 10 can be suppressed. Note that, at this time, because the positive pressure valve main body 178 contacts the flap valve main body 72, the positive pressure valve main body 178 does not move downward (toward the fuel tank 10 side).

In each of the second through fourth respective embodiments that were described above, in the same way as the first embodiment, the operation of opening the fuel filling port 26 when the fuel tank 10 interior becomes negative pressure is carried out by the negative pressure valve 60 that is separate from the flap valve 70. Because the valve opening pressure of the flap valve 70 can be set independently without relation to the valve opening pressure of the negative pressure valve 60, the valve opening pressure of the flap valve 70 is set to be high, and the sealability at the time when the flap valve main body 72 is at the closed position can be ensured to be high, and rattling when vibration or the like is applied to the flap valve main body 72 can be suppressed.

Further, in the respective second through fourth embodiments, because at least one of the positive pressure valve and the negative pressure valve is provided at the flap valve 70, due to the work of assembling this flap valve 70 to the inner pipe 24B, the positive pressure valve or the negative pressure valve that is mounted to the flap valve 70 also can be simultaneously assembled to the inner pipe 24B, and the assembly work is facilitated. From this standpoint, in the second embodiment for example, the negative pressure valve 112 may be provided at the top surface (the lid 30 side surface) of the flap valve main body 72.

In contrast, in a structure in which the positive pressure valve 50 and the negative pressure valve 60 are provided separately from the flap valve 70 as in the first embodiment, constraints on the shapes and structures and the like thereof respectively are fewer, and therefore, the degrees of freedom in design increase.

In the above-described respective embodiments, examples are described that apply the fuel filling section structure of the present invention to a fuel filling section that has the lid 30, but the fuel filling section structure of the present invention can be applied to a fuel filling section that does not have such a lid 30. For example, applying the present invention is preferable in the case of a structure in which, in a fuel filling section of a type that opens and closes the fuel filling port 26 by a cap, a positive pressure valve or a negative pressure valve (in particular, a negative pressure valve) is not provided at the cap.

The invention claimed is:

1. A structure for a fuel filling section of a fuel tank, comprising:
   a fuel filling port member comprising a fuel filling port in which a fuel filling gun, for filling fuel into a fuel tank, is inserted;
   an opening/closing valve that is provided at the fuel filling port member and closes the fuel filling port, and that opens the fuel filling port when pushed by the fuel filling gun;
   a positive pressure valve comprising
      a positive pressure valve main body that is movable between a positive pressure valve open position at which the positive pressure valve main body opens the fuel filling port and a positive pressure valve closed position at which the positive pressure valve main body closes the fuel filling port further toward a fuel tank side than the positive pressure valve open position,
      a first spring for the positive pressure valve that urges the positive pressure valve main body toward the positive pressure valve closed position, and
      a positive pressure valve supporting member that supports and maintains, at the positive pressure valve closed position, the positive pressure valve main body that is urged by the first spring, and, in a closed state of the opening/closing valve, when a tank internal pressure of the fuel tank is greater than a tank external pressure, the positive pressure valve opens the fuel filling port due to the positive pressure valve main body moving to the positive pressure valve open position against an urging force of the first spring; and
   a negative pressure valve comprising
      a negative pressure valve main body that is provided further toward the fuel tank side than the positive pressure valve main body and that is movable between a negative pressure valve open position at which the negative pressure valve main body opens the fuel filling port and a negative pressure valve closed position at which the negative pressure valve main body closes the fuel filling port by contacting the positive pressure valve main body, and
      a second spring for the negative pressure valve that urges the negative pressure valve main body toward the negative pressure valve closed position, the urging force of the second spring being set to be smaller than an urging force of the first spring, and, in the closed state of the opening/closing valve, when the tank internal pressure of the fuel tank is smaller than the tank external pressure, the negative pressure valve opens the fuel filling port due to the negative pressure valve main body moving to the negative pressure valve open position against the urging force of the second spring,
   wherein the opening/closing valve is provided at the negative pressure valve main body, and
   wherein a flow path for positive and negative pressure relief does not pass through the opening/closing valve.

2. The structure for a fuel filling section of a fuel tank of claim 1, wherein the negative pressure valve is opened in a state in which a difference between the tank external pressure and the tank internal pressure is less than a difference between the tank external pressure and the tank internal pressure required for the opening/closing valve to be in an open state.

* * * * *